(12) United States Patent
Senatore (10) Patent No.: US 7,455,312 B2
(45) Date of Patent: Nov. 25, 2008

(54) STOW-AWAY TRAILER SYSTEM

(76) Inventor: Peter J. Senatore, 900 Meadow La., Herkimer, NY (US) 13350

( * ) Notice: Subject to any disclaimer, the term of this patent is extended or adjusted under 35 U.S.C. 154(b) by 238 days.

(21) Appl. No.: 11/431,070

(22) Filed: May 10, 2006

(65) Prior Publication Data

US 2007/0262562 A1    Nov. 15, 2007

(51) Int. Cl.
*B60D 1/54* (2006.01)
(52) U.S. Cl. ............ 280/491.1; 280/475; 280/482; 280/491.2; 280/638
(58) Field of Classification Search ............ 280/491.1, 280/475, 482, 638, 491.2, 491.4
See application file for complete search history.

(56) References Cited

U.S. PATENT DOCUMENTS

| | | | | |
|---|---|---|---|---|
| 1,443,594 | A * | 1/1923 | Saives | 414/499 |
| 2,469,506 | A | 5/1949 | Kerr et al. | |
| 4,305,695 | A * | 12/1981 | Zachrich | 414/522 |
| 5,088,763 | A * | 2/1992 | Galazin et al. | 280/656 |
| 5,340,134 | A * | 8/1994 | Dodson | 280/37 |
| 5,897,154 | A * | 4/1999 | Albertini et al. | 296/37.6 |
| 5,941,542 | A | 8/1999 | Kalman | |
| 5,988,722 | A * | 11/1999 | Parri | 296/26.09 |
| 6,328,364 | B1 * | 12/2001 | Darbishire | 296/26.09 |
| 6,471,277 | B1 * | 10/2002 | Scensny et al. | 296/37.6 |
| 6,629,714 | B2 * | 10/2003 | Campbell | 296/37.6 |
| 6,733,026 | B1 * | 5/2004 | Robberson et al. | 280/415.1 |
| 6,991,249 | B2 * | 1/2006 | Shapiro | 280/648 |
| 7,055,848 | B1 * | 6/2006 | James | 280/656 |
| 7,059,626 | B2 * | 6/2006 | Koch | 280/656 |
| 7,178,823 | B1 * | 2/2007 | Tai | 280/656 |
| 7,240,977 | B2 * | 7/2007 | He | 312/333 |
| 7,296,837 | B2 * | 11/2007 | Niedziela et al. | 296/3 |
| 2005/0220591 | A1 * | 10/2005 | Doskocil | 414/498 |
| 2006/0043851 | A1 * | 3/2006 | Lee | 312/333 |
| 2006/0103279 | A1 * | 5/2006 | Lai | 312/333 |
| 2007/0080508 | A1 * | 4/2007 | Owens et al. | 280/1 |
| 2007/0145717 | A1 * | 6/2007 | Winter et al. | 280/491.1 |
| 2007/0236035 | A1 * | 10/2007 | Waldner | 296/26.11 |

* cited by examiner

*Primary Examiner*—Lesley D. Morris
*Assistant Examiner*—Tashiana Adams
(74) *Attorney, Agent, or Firm*—Bernhard P. Molldrem, Jr.

(57) ABSTRACT

A trailer and system for use with a vehicle that allows for storing the trailer in the vehicle during non-use. The foldable trailer and a receiving arrangement mountable to the vehicle, allows eased storage of the unused trailer and requires minimized storage space. The folding of the trailer also facilitates use of the trailer in various configurations for various needs.

14 Claims, 9 Drawing Sheets

STOW-AWAY TRAILER SYSTEM

FIELD OF THE INVENTION

The present invention relates to trailers for towing behind vehicles, and in particular, it relates to utility and cargo trailers and a system for using such with a vehicle and storing such in the vehicle during non-use. The invention relates specifically to a foldable trailer and a receiving arrangement mountable to the vehicle, which allows eased storage of the unused trailer and requires minimized storage space. The folding of the trailer also facilitates use of the trailer in various configurations for various needs.

BACKGROUND AND OBJECTIVES OF THE INVENTION

Utility trailers that can be folded up during periods of non-use for compact storage are well known. Such trailers are taught in prior art U.S. Pat. Nos. 5,941,542 and 2,469,506.

While such trailers provide the benefit of requiring reduced storage space when compared to the trailer in its normal configuration, the weight and other aspects of such prior art trailers make storage within a vehicle, such as in the bed of a pick-up truck or in the back of a station wagon, impractical.

Further, such prior art trailers are awkward for positioning into and securing within the vehicle.

It is often the case that a trailer is needed during only a portion of a journey in a vehicle, or that a trailer is needed at unforeseen times. Yet towing a trailer at all times just to be prepared for that occasional need is not practical, safe, or convenient.

There exists therefore a heretofore unsolved need to provide a trailer which can be hitched to a vehicle for use, and which can carry a substantial payload during use, yet which can be simply and quickly reconfigured following use into a shape and size capable of fitting within the vehicle, and which can be easily and conveniently moved from its use position into its storage position in the vehicle without undue burden or strain and which can be conveniently secured there.

Additionally, trailers of the prior art lack convenient adaptability to varying types of uses.

There exists therefore a heretofore unsolved need to provide a trailer as described above which may be easily and conveniently adapted into a variety of configurations according to the type of use required, without tools or complicated reassembly techniques.

Additionally the means for compacting such prior art trailers as mentioned above are cumbersome and complex.

There exists therefore a heretofore unsolved need to provide a trailer as described above which simplifies the means for folding and compacting the trailer during conversion from its use configuration to its storage configuration.

These and other needs, drawbacks and omissions in the prior art are addressed by a trailer and system according to the present invention.

SUMMARY OF THE INVENTION

The present invention provides a trailer which can be hitched to a vehicle for use, and which can carry a substantial payload during use, yet which can be simply and quickly reconfigured following use into a shape and size capable of fitting within the vehicle, which can be easily and conveniently moved from its use position into its storage position in the vehicle without undue burden or strain, and which is effectively and conveniently secured within the vehicle by the same system that has facilitated the ease and convenience of storing.

The present invention further provides a trailer as described above which may be easily and conveniently adapted into a variety of configurations according to the type of use required, without tools or complicated reassembly techniques.

The present invention further provides a trailer as described above which simplifies the means for folding and compacting the trailer during conversion from its use configuration to its storage configuration.

Additionally, the present invention further provides a system including a trailer as described above and means for adapting a vehicle to cooperate with the trailer during storing and storage to simplify and ease storing, and to organize storage and minimize storage volume.

The present invention provides a trailer and system, which not only advance the art of trailers, but also additionally provide a unique mechanism for storing the trailer during non-use, in the very vehicle intended to tow the trailer during use.

Because the trailer of the present invention may be so easily and conveniently stored within the vehicle when not in use, and may be so easily and conveniently removed from the vehicle and put into use, it makes the trailer available on an as-needed basis, at all times including unexpected times, and it eliminates the towing of an unused trailer from points of actual use, to points of intended use, and "just in case".

The present invention's system provides means for adapting the vehicle to ease storing of the trailer therein, for receiving and guiding the trailer during storing, and to affix the trailer in a desired and consistent position during storage.

The present invention's trailer further provides adaptability heretofore unrealized by the prior art, allowing the trailer to be quickly and conveniently reconfigured into a variety of useable configurations, including an extended or shortened flat-bed trailer, an extended or shortened front panel trailer, and extended or shortened side-panel trailer, and an extended or shortened box trailer.

Various aspects of the trailer and system improve convenience and functionality over the state of the art, including but not limited to means for quickly and conveniently folding the trailer from its use configuration into its storage configuration, means for guiding the folded trailer into a predetermined position in the vehicle which reduce strain on the trailer, vehicle, or user, and means for holding the stored trailer rigidly in that predetermined position.

Additional benefits will be appreciated upon review of the drawings and description contained herein of the invention's preferred embodiment.

DESCRIPTION OF THE PREFERRED EMBODIMENT

Figure 1:
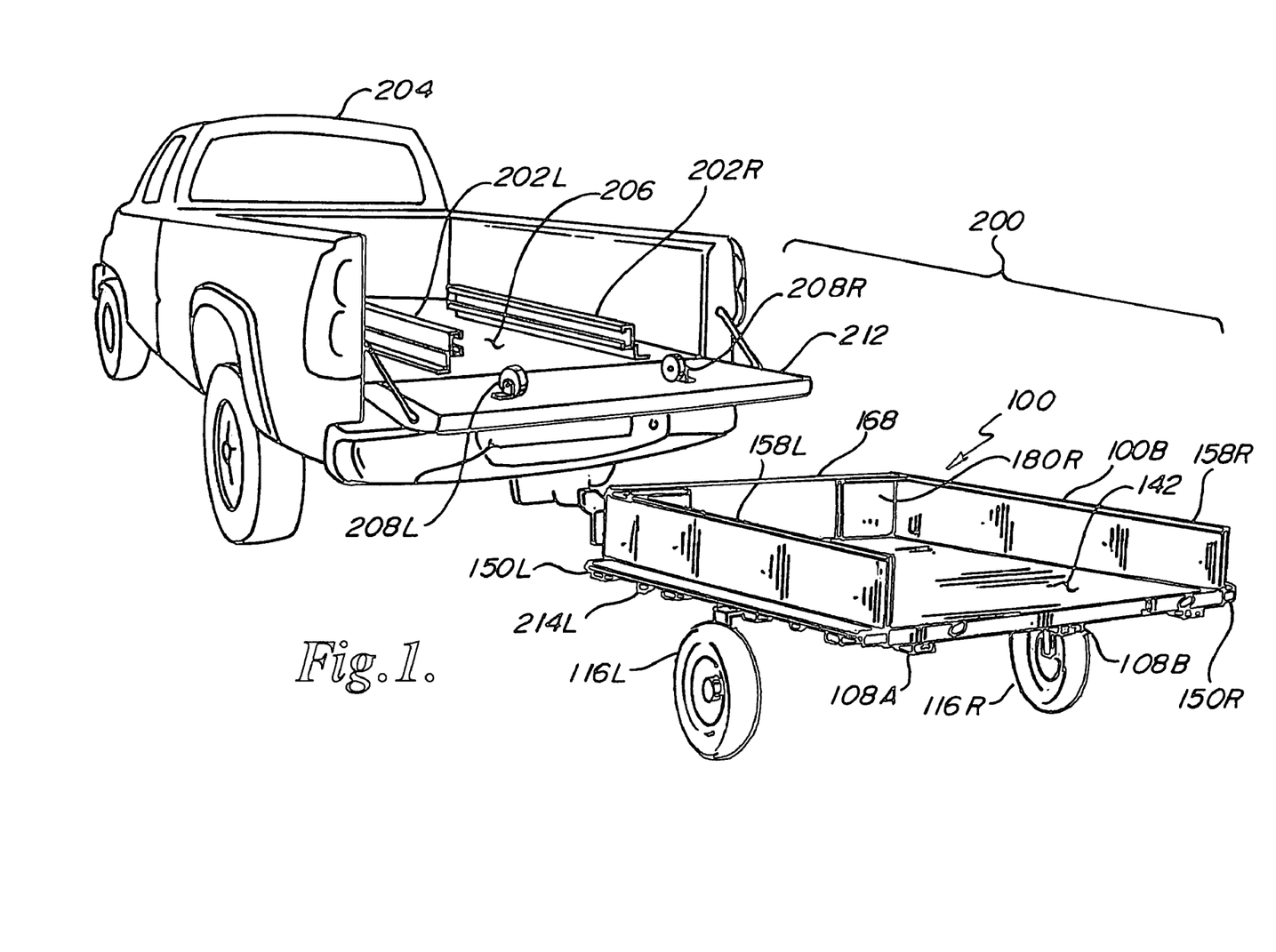
FIG. 1 is a rear perspective of a trailer and system in accordance with the preferred embodiment of the invention, wherein the trailer is in a box trailer configuration and hitched to a pick-up truck and ready for use.

Referring to FIG. 1, there is shown a trailer 100 and system 200 according to the preferred embodiment of the invention with the trailer configured for use and hitched to a typical pick-up truck 204.

Trailer 100 consists of a main frame 106 preferably comprising three parallel square tubular steel longitudinal beams, 108A through 108C. Center longitudinal beam 108B serves as the support for hitch assembly 132 and also defines the longitudinal axis of main frame 106 and trailer 100. Longitudinal beams, 108A through 108C are rigidly and perpendicularly connected to four parallel square tubular steel upper cross beams, 112A through 112D, and to one square tubular lower cross beam 114, which serves as a support for two identical wheel assemblies 116R and 116L. The longitudinal and cross beams are welded, riveted or otherwise permanently fastened together to cooperatively form a rigid and strong rectilinear structure, being main frame 106.

As this trailer 100 is preferred embodiment aimed to fit within the bed of a typical full-sized pick-up truck, main frame 106 has a width and length restricted accordingly. The length of longitudinal beams 108A through 108C, and thus the length of main frame 106, and thus the length of trailer 100 when folded for storage, is approximately 96 inches. The length of cross beams 112A through 112D, and thus the width of main frame 106, and thus the width of trailer 100 when folded for storage, is approximately 55 inches. In alternative trailer embodiments intended for storage into vehicles able to accept folded trailers of different dimensions, not shown here, the length and width dimension and the numbers of longitudinal and cross beams may be modified accordingly without departing from the spirit if the invention.

Figure 3:
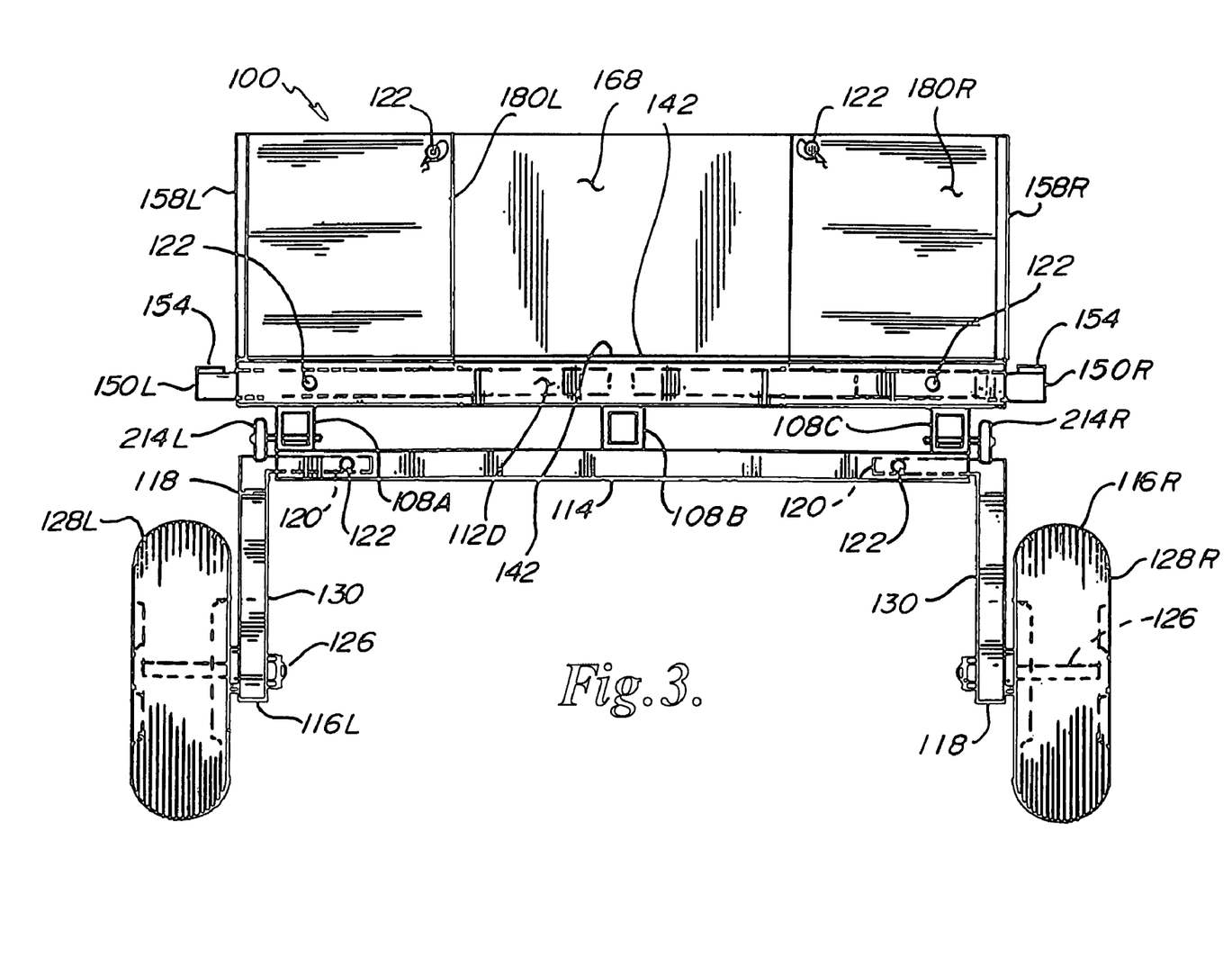
FIG. 3 is a rear view of the trailer of FIG. 1.
Figure 9:
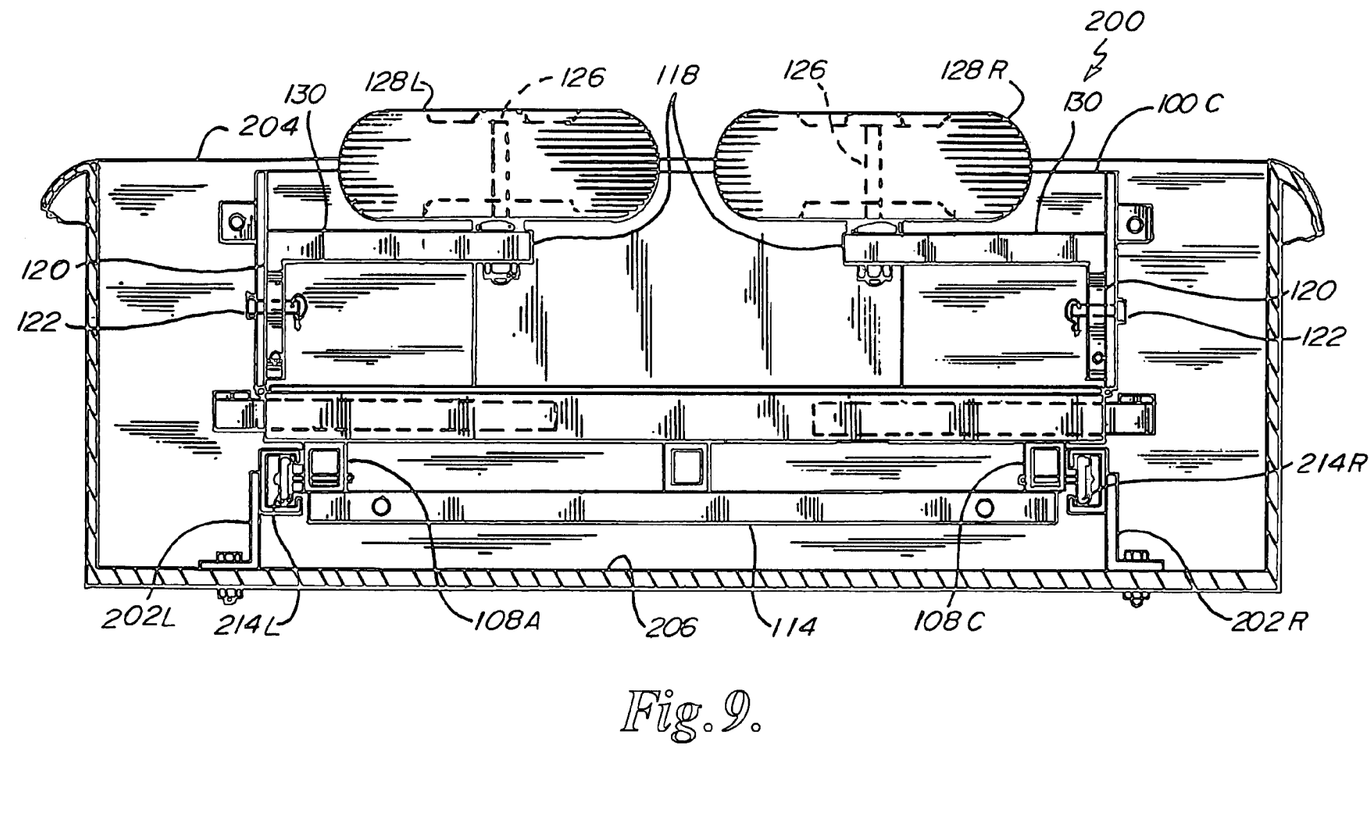
FIG. 9 is a partial rear view of the truck bed showing the storage of the folded trailer therein.

Wheel assemblies 116R and 116L are best viewed in FIGS. 3 and 9, and each comprise support arm 118, having a horizontal square shaft portion 120 sized and shaped to fit snugly and removably within the square hollow interior of square tubular lower cross beam 114. Removable pin/clip set 122 passes through aligned holes in both shaft portion 120 and lower cross beam 114, to temporarily affix shaft portion 120, and thereby wheel assemblies 116R and 116L, firmly to lower cross beam 114, and thereby to main frame 106. Such removable pin/clip sets, as are preferably used throughout the invention, are commonly used in a variety of trailer applications, are commonly sold where trailer parts are sold, are well known, convenient, inexpensive, and reliable, but may be substituted by any sufficient means for temporarily and removably affixing the shaft to the beam without departing from the spirit of the invention.

Support arm 118 further comprises outwardly projecting axle 126, onto which is mounted tired wheel 128R or 128L, using any typical state of the art trailer axle/bearing/wheel arrangement (not shown). Tired wheels 128R and 128L are preferably typical trailer-type tire/wheel assemblies, as are commonly used on trailers, are readily replaceable wherever trailer parts are sold, and are rotationally free relative to axle 126 and thereby to trailer 100. Vertical connecting arm 130 rigidly connects axle 126 to shaft portion 120, to complete the support arm 118, such that when both wheel assemblies 116R and 116L are affixed to the main frame 106, both axles 126 are coaxially positioned parallel to and sufficiently below lower cross beam 114, and the two tired wheels 128R and 128L are substantially aligned perpendicular to center longitudinal beam 108, and thereby to the longitudinal axis of the trailer 100, and disposed horizontally such that the lowest points of the tired wheels will be substantially at ground level during use.

By removing pin/clip set 122, each wheel assembly 116R and 116L may be freely removed from main frame 106, and positioned elsewhere for storage, as will be described later.

Hitch assembly 132, comprises hitch bar 134 and hitch receiver 136, which are rigidly affixed together by welding, riveting, or any other sufficiently strong fastening means. Square hitch bar 134 is sized and shaped to fit snugly and movably within the square hollow interior of center longitudinal beam 108B. Removable pin/clip set 122 is positioned through aligned holes in both bar 134 and beam 108B, to temporarily affix hitch assembly 132 to main frame 106. Hitch bar 134 may be substantially long, up to the same length as center longitudinal beam 108B, and center longitudinal beam 108B includes several holes 138 for receiving pin/clip set 122, said holes 138 being equally longitudinally spaced and positioned to allow hitch assembly 132 to be moved within beam 108B and repositioned and re-fixed longitudinally to thereby render trailer 100 longitudinally extendible and adaptable to payloads of various lengths and sizes.

Trailer 100 further comprises flat horizontal bed panel 142, whose width, measured in the transverse horizontal direction perpendicular to the trailer's longitudinal axis, and length, measured in the longitudinal horizontal direction along the trailer's longitudinal axis, are substantially equal to those of main frame 106. As explained above, in this preferred embodiment, that width is approximately 5 inches and that length is approximately 96 inches. Bed panel 142 may be made of flat or embossed steel sheeting, plywood, or any other suitable material, and is rigidly and permanently affixed atop main frame 106 by any common fastening means, including welding. Bed panel 142 provides a supporting surface for the payload that may be carried by the trailer when in use.

Figure 4:
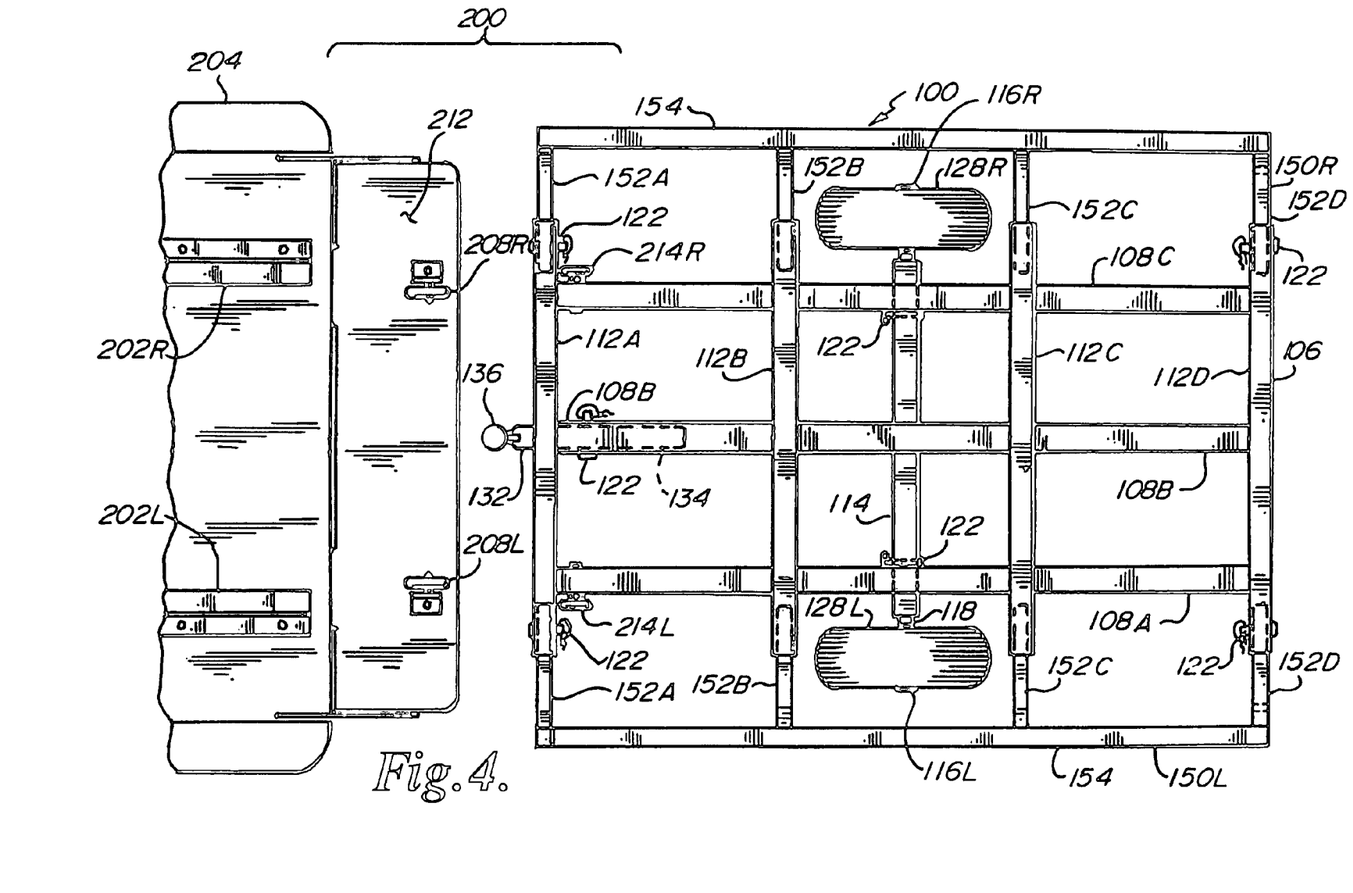
FIG. 4 is a top view of the trailer and truck of FIG. 1, with the trailer panels removed for clarity, the extension frames installed in their extended positions and with the trailer unhitched from the truck.

Two extension frames 150L and 150R consist of four parallel extension bars 152A to 152D, perpendicularly connected to longitudinal side bar 154. Square extension bars 152A through 152D are sized and shaped to fit snugly and movably within the square hollow interior of square tubular steel upper cross beams, 112A through 112D. Removable pin/clip sets 122 pass through aligned holes 154 in both bars 152A and 152D and in beams 112A and 112D, to temporarily affix extension frame 150L or 150R to main frame 106 in either of two positions, those being the retracted position shown in FIG. 3 and the extended positions shown in FIGS. 4, 5 and 6A.

Figures 2, 6A, 6B:
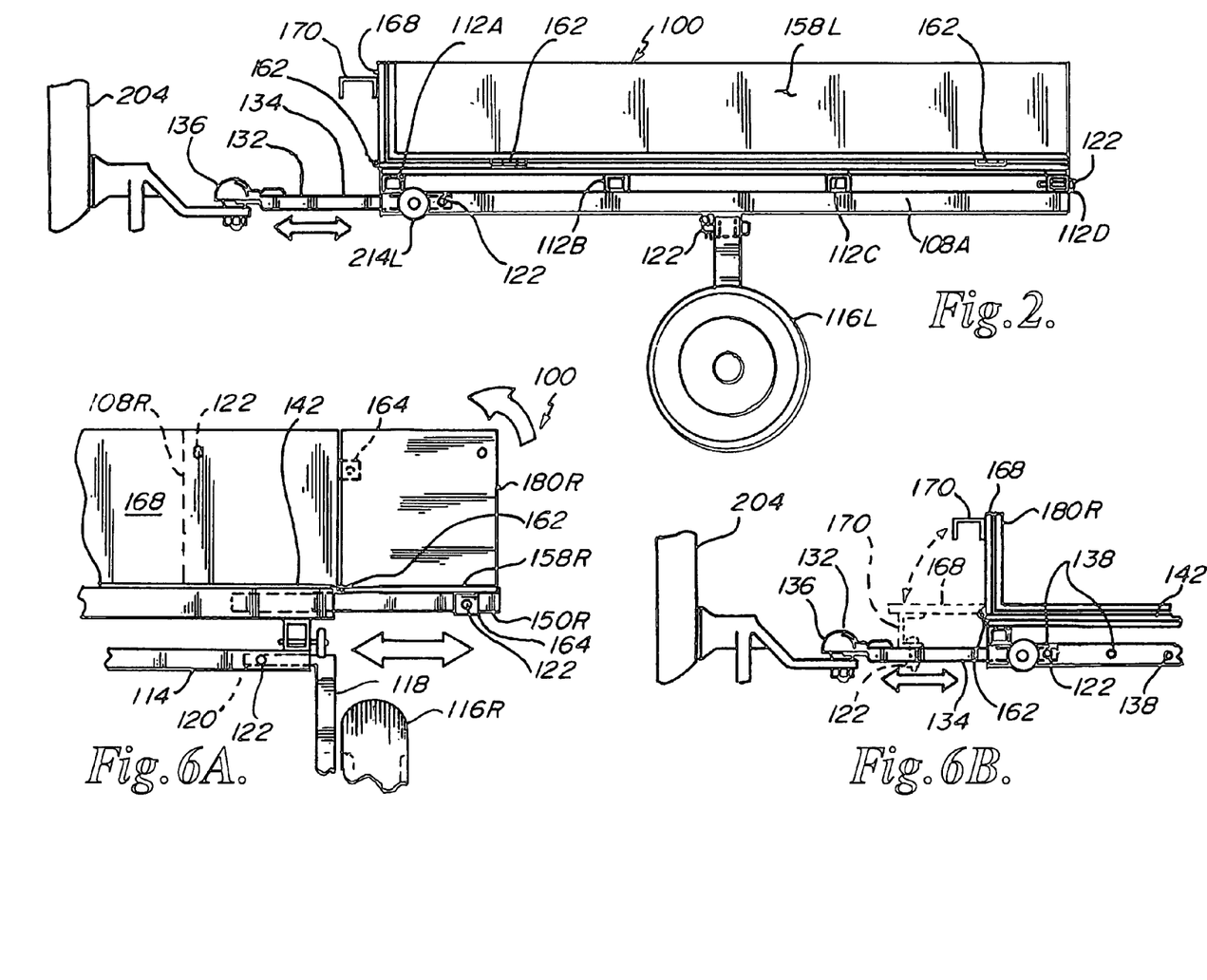
FIG. 2 is a side view of the trailer and truck of FIG. 1.
FIG. 6A is a partial rear view showing an extension frame and the horizontal and vertical positioning of a side panel.
FIG. 6B is a partial side view showing the horizontal and vertical positions of the front panel and the extendibility of the hitch bar.
Figure 5:
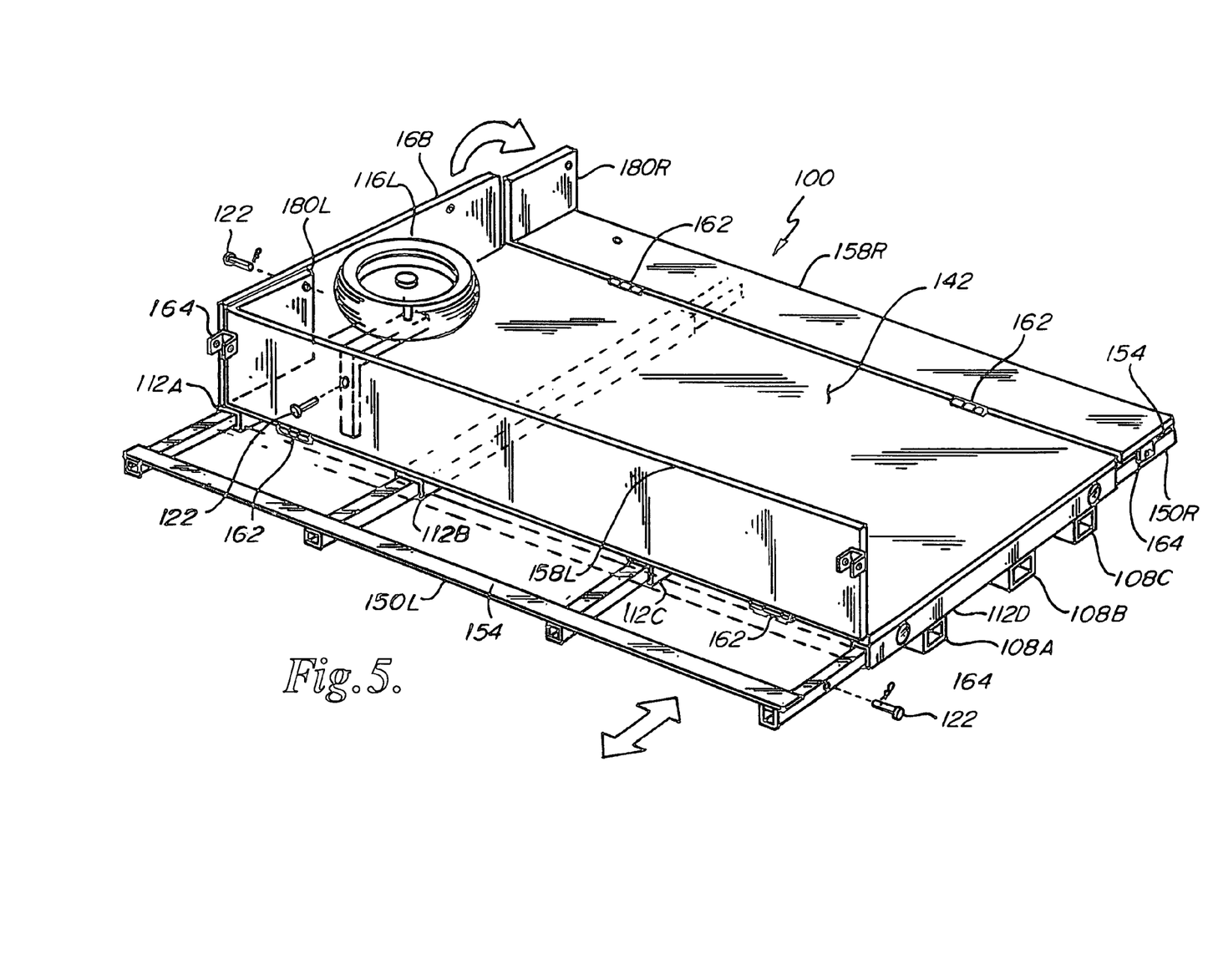
FIG. 5 is a rear perspective view showing the folding of the trailer of FIG. 1 into its compact storage configuration.
Figure 10:
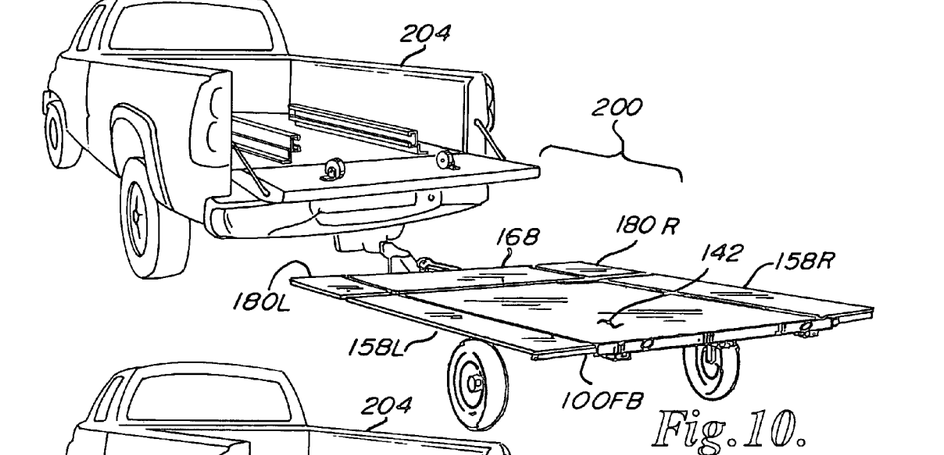
FIG. 10 is a perspective view of an alternate use configuration for the trailer as a flat bed trailer.

Side panels 158L and 158R, made of flat or embossed steel sheeting, plywood, or any other suitable material, are attached by hinges 162 to the side edges of bed panel 142 and may be positioned about these hinges into either a vertical upright position as shown in FIGS. 1 through 3 and as panel 158L is shown on the near side of FIG. 5. Or the panels may be laid down horizontally to rest against the extended extension frames 150L and 150R and be coplanar with bed panel 142, as shown in FIGS. 6A and 10, and as panel 158R is shown on the distant side of FIG. 5.

Bracket 164 is permanently affixed to side panels 158L and 158R and disposed and configured to capture extension bars 152A and 152D when the panels are in their horizontal position. Pin clip sets 122 are inserted though aligning holes in brackets 164 and the extension bars to temporarily rigidly hold the panels to the extension bars.

Figure 11:
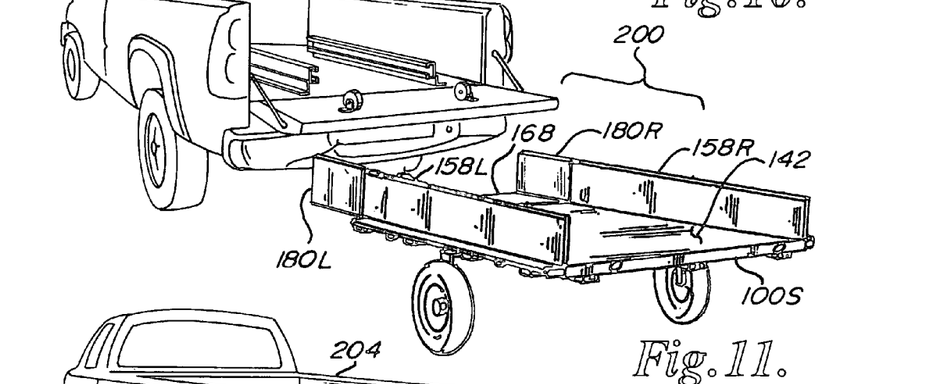
FIG. 11 is a perspective view of an alternate use configuration for the trailer as a side-paneled trailer.

Front panel 168 made of flat or embossed steel sheeting, plywood, or any other suitable material, is attached by hinges 162 to the front edge of bed panel 142 and may be positioned about these hinges into either a vertical upright position as shown in FIGS. 1 through 3, 5, 7 and 12, and as shown in solid line in FIG. 6B. Or the panel may be laid down horizontally so that C-channel 170 rests against the hitch bar 134 and is thereby coplanar with bed panel 142, as shown in FIGS. 10 and 11 and in broken line in FIG. 6B. Pin clip set 122 is inserted though aligning holes in C-Channel 170 and hitch bar 134 to temporarily rigidly hold the panel to the hitch bar.

When front panel 168 is in its upright vertical position, it is supported by front panel supports 174, which each comprise vertical support member 176 and square horizontal bar portion 178 that is sized and shaped to fit snugly and removably within the square hollow interior of either longitudinal beam 108A or 108C, into which it is temporarily affixed by pin/clip set 122.

Wing panels 180R and 180L made of flat or embossed steel sheeting, plywood, or any other suitable material, are attached by hinges 162 to the forward edges of side panels 158R and 158L respectively, and each may be positioned about these hinges into either an upwardly or inwardly directed perpendicular position or a coplanar position, relative to the side panel.

As shown in FIGS. 1 through 3 and as wing panel 180L is shown on the near side of FIG. 5 and in broken line in FIG. 6A, the inwardly directed position of the wing panel 180R or 180L, when the side panel 158R or 158L is in its vertical position, serves to support the vertically positioned front panel 168 when the trailer 100 is configured as a box trailer or folded compactly for storage. Pin/clip set 122 is positioned through aligning holes in the wing and front panels to temporarily rigidly connect the panels. In its box trailer configuration 100B shown in FIG. 1, the trailer is especially adapted to carry payloads in need of side support and wind protection, such as dirt or leaves.

Alternatively, the wing panels 180R and 180L may be laid down horizontally to be coplanar with bed panel 142, as shown in FIG. 10, when the trailer 100 is configured as a flat-bed trailer 100FB. Pin/clip sets 122 (not shown) or some other fastening means temporarily rigidly connect the front and wing panels. In its flat-bed trailer configuration shown in FIG. 10, the trailer is especially adapted to carry large payloads in need of a wide and flat support surface, such as plywood or paneling.

Or the wing panels 180R and 180L may be extended coplanar with the side panels 158R and 158L and perpendicular to the horizontally positioned front panel 168 and bed panel 142, as shown in FIG. 11, when the trailer 100 is configured as a side-paneled trailer 100S. Pin/clip sets 122 (not shown) or some other fastening means temporarily rigidly connect the front and wing panels. In its side-paneled trailer configuration shown in FIG. 11, the trailer is especially adapted to carry long payloads such as lumber or piping.

Figure 12:
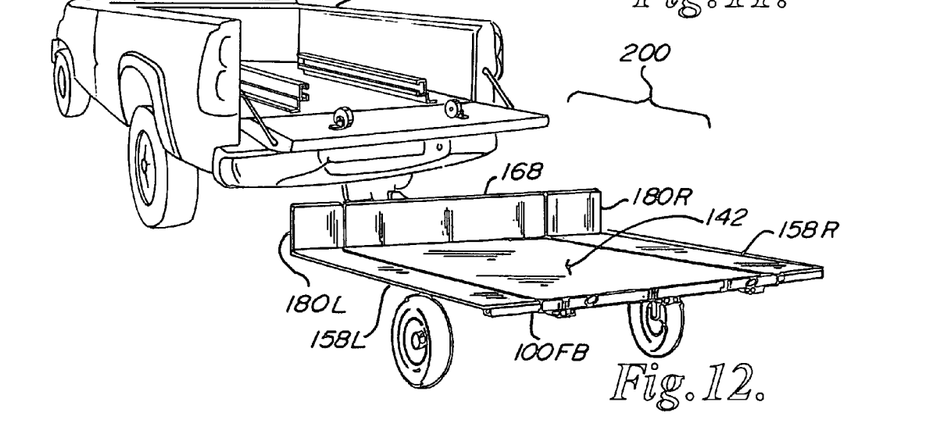
FIG. 12 is a perspective view of an alternate use configuration for the trailer as a front-paneled trailer

Or, as shown in solid line in FIG. 6A and as wing panel 180R is shown on the far side of FIG. 5, the upwardly directed position of wing panel 180R or 180L, when the side panel 158R or 158L is in its horizontal position, serves as an extension of the vertically positioned front panel 168 when the trailer 100 is configured as a front-paneled trailer 100FP as shown in FIG. 12. Pin/clip sets 122 (not shown) or some other fastening means temporarily rigidly connect the front and wing panels. In its front-paneled trailer configuration shown in FIG. 12, the trailer is especially adapted to carry wide payloads in need of protection from wind and road grime, such as a snowmobiles or a motorcycle.

Figures 7, 8C:
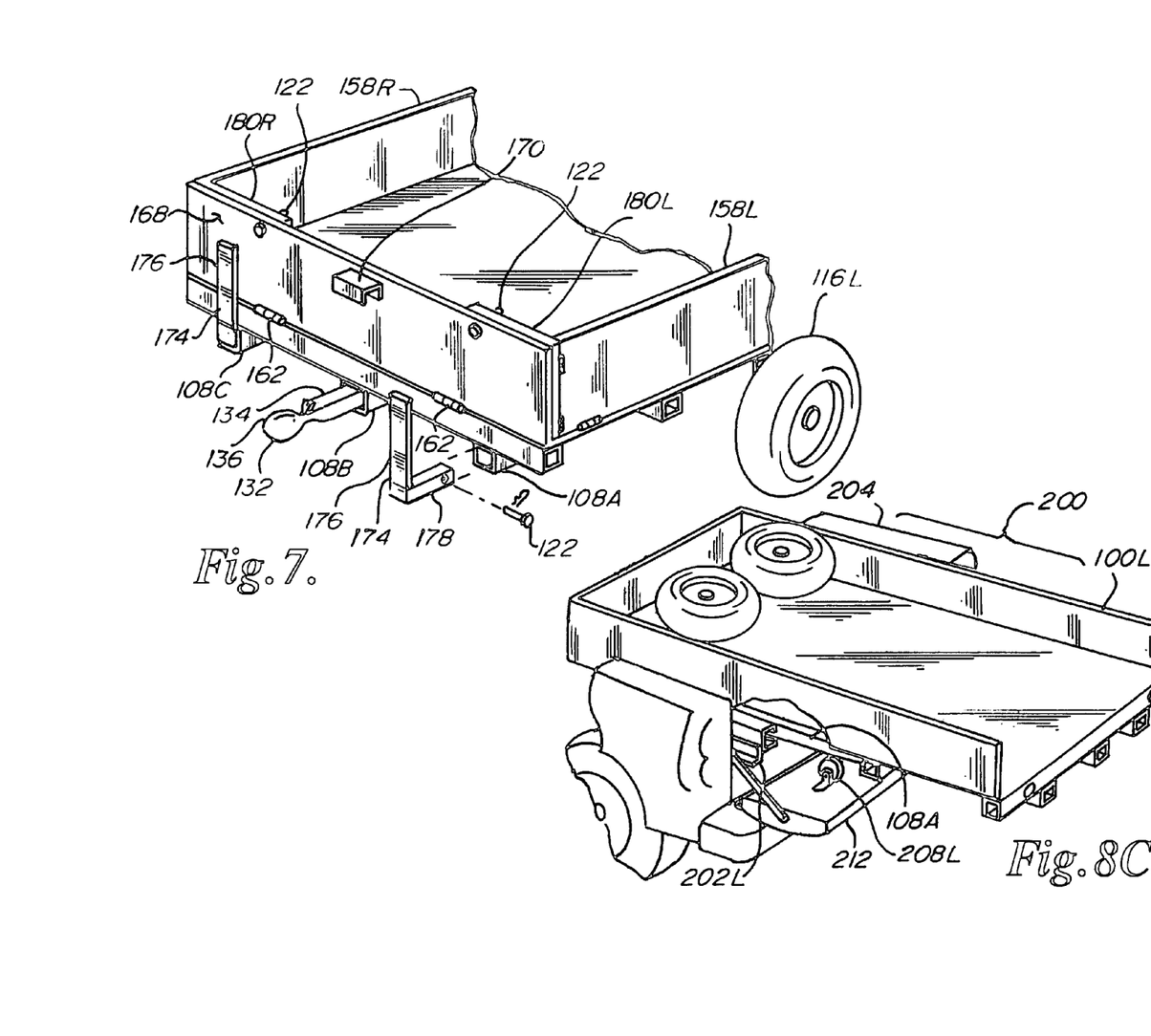
FIG. 7 is a front perspective view showing the installation of the front panel supports.
FIGS. 8A-8C is a progressive series of rear perspectives view showing the loading of the folded trailer into the truck's bed for storage, and the interaction between the guide rollers and guide channels during the process of storing the trailer into the truck bed.
Figure 8A:
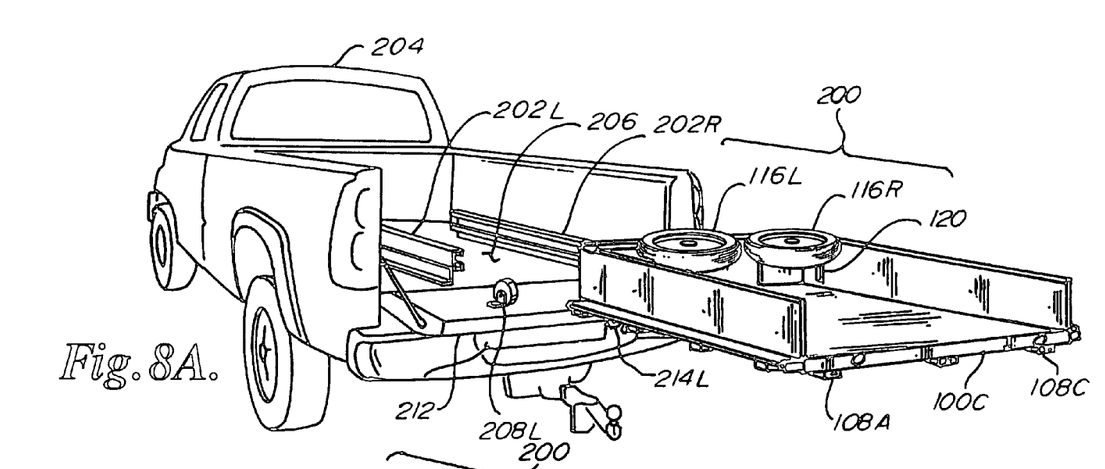
Figure 8B:
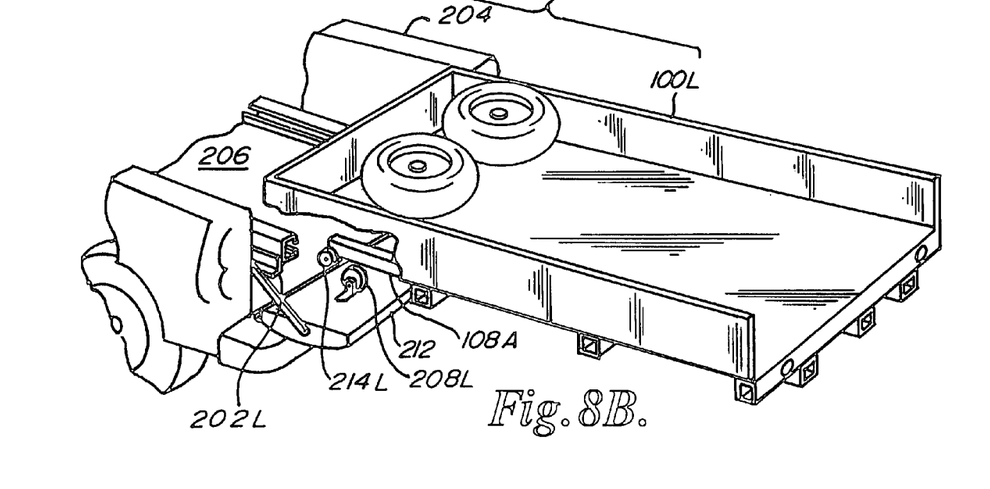

Upon the completion of use of the trailer 100 in whichever configuration had been used, trailer 100 can be easily and quickly folded up into a compact configuration for storage as shown in FIG. 5, and can be easily and conveniently stored into the very vehicle which had been towing it, as shown in FIGS. 8A to 8C, and can be secured and stored within the vehicle, as shown in FIG. 9.

Referring to FIG. 5, conversion of trailer 100 into its compact storage configuration is shown. First, front panel 168, side panels 158R and 158L, wing panels 180R and 180L are configured and affixed into the same positions as those used and described above for the box trailer configuration. Extension frames 150R and 150L are either pushed inward to their retracted positions or removed and stored within the trailer, hitch assembly 132 is disconnected from truck 204 and is either pushed inward into its retracted position or removed and stored within the trailer, and wheel assemblies 116R and 116L are removed and stored as shown within the trailer. Holes are strategically positioned about the retailer panels so that those pin/clip sets used to fix each of these removed components may be temporarily rigidly fixed in a secure position within the trailer during storage.

Referring to FIGS. 8A through 8C, the process of storing the compacted trailer 100C into the vehicle and the system for doing so is shown. System 200 comprises a pair of longitudinal guide channels 202R and 202L which are permanently affixed within the vehicle, such as within the bed 206 of a truck 204, transversely aligned support rollers 208R and 208L, which are permanently affixed to the inner surface of the truck's rear hatch 212, and transversely aligned guide rollers 214R and 214L, which extend outwardly from longitudinal beams 108A and 108C. Support rollers 208R and 208L are positioned and arranged to be aligned with and support the undersides of beams 108C and 108A respectively, so that a lone person may easily lift just the forward end of the compacted trailer 100C onto the rear hatch 212 and position beams 108A and 108C onto the support rollers 208L and 208R, respectively, then walk around to the rear end of the trailer and lift the trailer for easily aligning it for storing. Guide channels 202R and 202L are positioned for alignment with and are shaped and configured to receive guide rollers 214R and 214L, respectively, so that the person can simply push and roll the compacted trailer 100C into the truck bed 206 much in the way a cabinet drawer is pushed in.

Once trailer 100C is fully inserted into truck bed 206, it is secured in place either by merely closing hatch 212 or by the use of pin/clip sets 122 through holes (not shown) in guide channels 202R and 202L to temporarily deny longitudinal movement of the trailer relative to the channels.

Reversal of the storing process is followed to take the trailer out at the convenience of such a lone person, and to hitch it to the vehicle and configure it for the desired type of use.

It should be obvious to those skilled in the art that the afore-described is merely one of many possible embodiments of the invention, and is not intended to limit the scope of the invention in any way. The invention is therefore best characterized by and should only be limited by the following claims;

I claim:

1. A method of using a trailer with a vehicle and storing said said trailer in said vehicle comprising:
   Compacting said trailer from a normal use configuration into a less voluminous storage configuration,
   Providing one or more guide rollers connected to either said trailer or said vehicle,
   Providing one or more guide channels connected to the other of said trailer or said vehicle, said one or more guide channels being alignable with and adapted to receive said one or more guide rollers,
   Aligning said one or more guide rollers and said one or more guide channels,
   Pushing said trailer into said vehicle so that said one or more guide rollers are received by said one or more guide channels and said trailer is thereby guided into a desired storage location within said vehicle, and
   Securing said trailer within said vehicle, at said desired location.

2. The method of claim 1 wherein
   Said trailer comprises foldable portions, and
   Said compacting comprises folding said foldable portions from said normal use configuration wherein said trailer is incapable of being fitted within said vehicle, into said less voluminous storage configuration wherein said trailer is compacted into a size and shape capable of being fitted within said vehicle.

3. The method of claim 2 wherein said trailer is alternatively adaptable by alternatively folding said foldable portions into one or more alternative use configurations for alternative types of intended uses.

4. The method of claim 3 wherein said alternative configurations include a box trailer and a flat-bed trailer.

5. The method of claim 1 further comprising providing one or more support rollers connected to one of said trailer or said vehicle and adapted to support and guide said trailer for aligning of said one or more guide rollers and said one or more guide channels.

6. The method of claim 5 wherein said trailer comprises foldable portions and said compacting comprises folding said foldable portions from said use configuration wherein said trailer is incapable of being fitted within said vehicle, into said less voluminous storage configuration wherein said trailer is compacted into a size and shape capable of being fitted within said vehicle.

7. The method of claim 6 wherein said trailer is alternatively adaptable by alternatively folding said foldable portions into one or more alternative use configurations for alternative types of intended uses.

8. The method of claim 7 wherein said alternative configurations include a box trailer and a flat-bed trailer.

9. The method of claim 5 wherein said one or more guide rollers is connected to said trailer and said one or more guide channels is connected to said vehicle.

10. The method of claim 9 wherein said one or more support rollers is connected to said vehicle.

11. The method of claim 10 wherein:
    Said one or more guide rollers connected to said trailer comprises a pair of transversely aligned guide rollers, and
    Said one or more guide channels connected to said vehicles comprises a pair of longitudinal slots, each longitudinally aligned with one or said pair of guide rollers, said slots being adapted to accept there within said guide rollers, said guide rollers being adapted to roll longitudinally within said slots to thereby ease and guide said trailer into said desired storage position.

12. The method of claim 11 wherein
    Said one or more support rollers comprise a pair of transversely aligned support rollers, and
    Said trailer further comprises a pair of support rails, each longitudinally aligned with one of said pair of support rollers, and wherein
    Said support rollers and said support rails are adapted to cooperatively support and guide said trailer for aligning of said guide rollers into said guide channels.

13. The method of claim 1, wherein said providing the one or more guide rollers includes providing said rollers on a horizontal axis so that the one or more guide rollers support the weight of the trailer on the associated one or more guide channels when the trailer is pushed into place into said vehicle.

14. The method of claim 1, wherein said compacting includes folding in one or more hinged side panels of the trailer, which are hinged to a floor panel, to render the trailer narrower in its storage configuration than in its normal use configuration.

* * * * *